July 2, 1963 N. H. PEIFFER ETAL 3,095,931
BLADE PITCH CONTROL MECHANISM FOR A HELICOPTER
Filed May 10, 1961 2 Sheets-Sheet 1
FIG.1
FIG.2
FIG.3
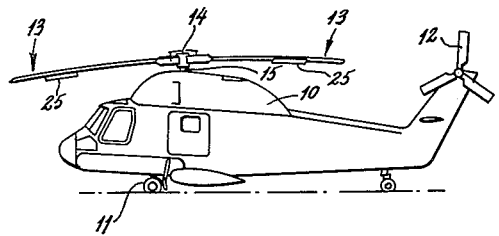
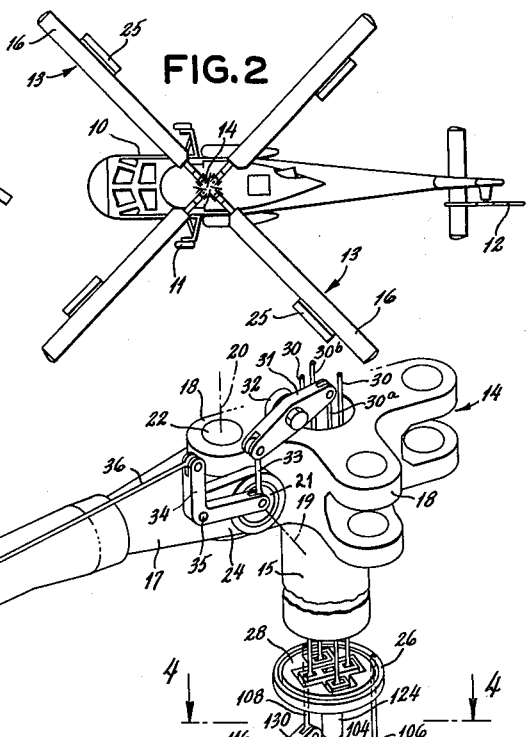
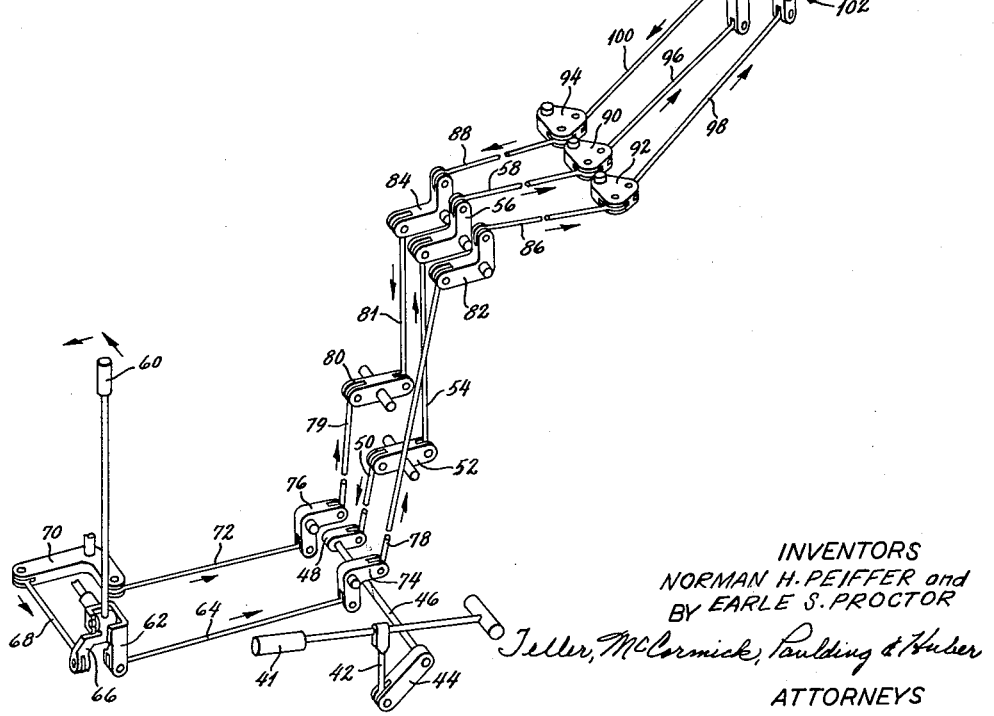
INVENTORS
NORMAN H. PEIFFER and
EARLE S. PROCTOR
BY Teller, McCormick, Paulding & Huber
ATTORNEYS July 2, 1963 N. H. PEIFFER ETAL 3,095,931
BLADE PITCH CONTROL MECHANISM FOR A HELICOPTER
Filed May 10, 1961 2 Sheets-Sheet 2
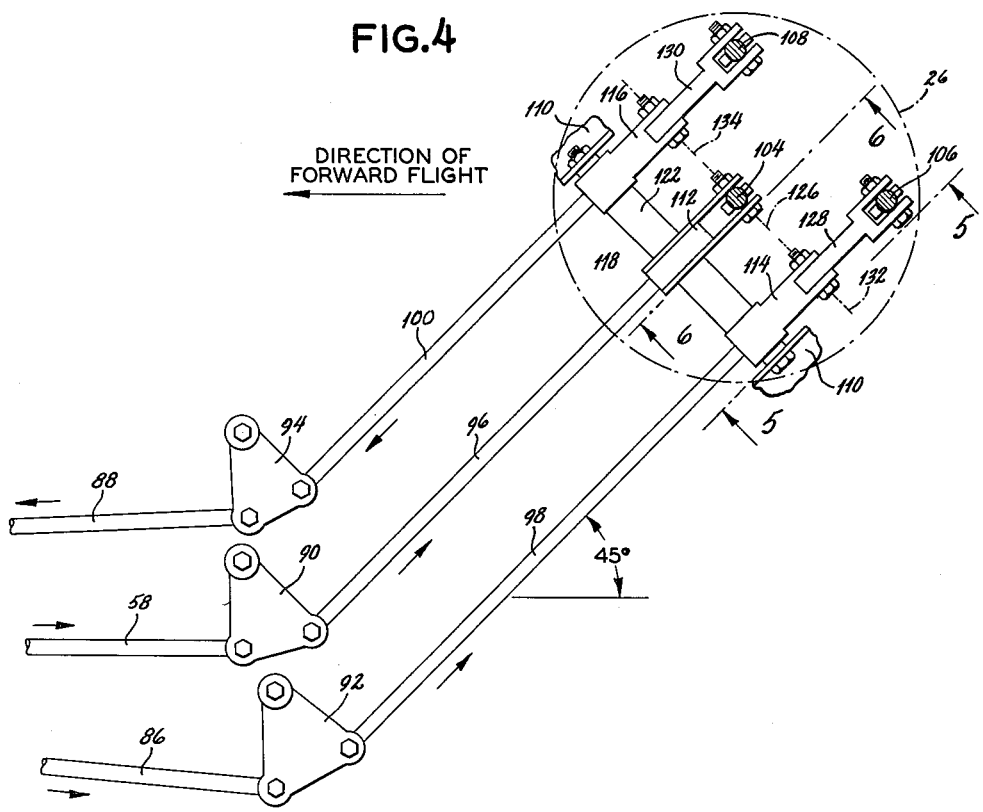
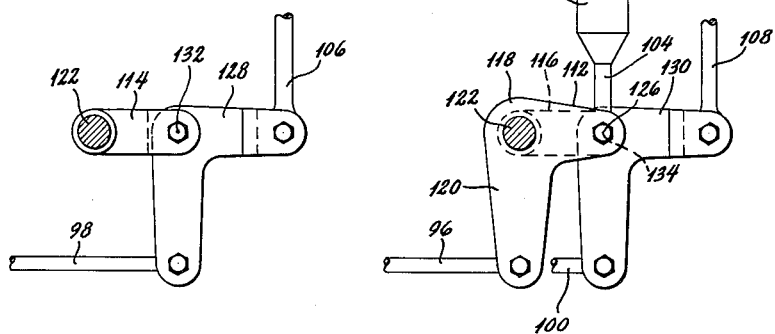

3,095,931
BLADE PITCH CONTROL MECHANISM
FOR A HELICOPTER
Norman H. Peiffer, Scottsdale, Ariz., and Earle S. Proctor, Los Gatos, Calif., assignors to Kaman Aircraft Corporation, Bloomfield, Conn., a corporation of Connecticut
Filed May 10, 1961, Ser. No. 109,218
5 Claims. (Cl. 170—160.25)

The invention relates to a blade pitch control mechanism for a helicopter and the general object of the invention is to provide a pitch control mechanism which is reliable and relatively simple in construction and which has certain structural and functional advantages.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a side view of a helicopter adapted for the incorporation therein of a rotor blade pitch control mechanism embodying the invention.

FIG. 2 is a plan view of the helicopter shown in FIG. 1.

FIG. 3 is a schematic view of the blade pitch control mechanism.

FIG. 4 is an enlarged combined sectional and plan view of a portion of the blade pitch control mechanism, the sectional portion of the view being taken along the line 4—4 of FIG. 3.

FIG. 5 is a sectional view taken along the line 5—5 of FIG. 4.

FIG. 6 is a sectional view taken along the line 6—6 of FIG. 4.

General Organization

Referring to the drawings, and more particularly FIGS. 1, 2 and 3 thereof, 10 represents the fuselage of a helicopter having a rotor adapted for control by a mechanism embodying the invention, 11 represents the landing gear, and 12 represents the tail rotor. These parts can be widely varied and they do not of themselves constitute any part of the invention.

The rotor of the helicopter comprises a plurality of generally radial blades 13, 13 connected with a hub 14 and uniformly spaced about a central vertical axis. As shown, the rotor has four blades, but the invention is not necessarily so limited. The hub 14 is connected with a vertical power shaft 15 extending upwardly from the fuselage 10. Each blade 13 has an outboard lifting portion 16 and an inboard member 17, the portion 16 being rotatably movable about a radial axis for changes in blade pitch.

There may be wide variation as to the rotative connection between the lifting portion and the inboard member of each blade, and as to the connections between the inboard members and the hub. Representative connections are shown in the drawings and will be described.

When there are four blades, as shown, the hub 14 has four radial arms 18, 18 with which the inboard members 17 of the blades are respectively connected for movement about horizontal flapping axes 19 and about vertical lead-lag axes 20. As shown in FIG. 3 each hub arm 18 is bifurcated and a pivot block 21 is located between the bifurcations. The block 21 has a vertical bearing opening therein for a pivot pin 22 which provides for pivotal movement about said lead-lag axis 20. The inboard blade member 17 has an outer tubular portion and said member is bifurcated at its inner end to provide bifurcations 24 which embrace said pivot block 21. Said bifurcations 24 are pivotally connected with the block for flapping movements about said axis 19.

The lifting structure 16 of each blade is carried by a supporting element 23 and the inner portion of said element is tubular and surrounds the tubular portion of the inboard member 17. Bearings (not shown) are interposed between said tubular portions and these bearings permit the outboard portion 16 of the blade to turn relatively to the inboard member 17 for effecting changes in pitch. Tension-torsion members (not shown) are provided within said tubular portions, and said members are connected at their outer ends with the outboard portion 16 and are connected at their inner ends with the inboard portion 17. Said tension-torsion members serve to prevent outward movement of the outboard blade portion and they also serve to resist rotative movement of said outboard portion.

The invention in its broader aspects is not narrowly limited as to the means for effecting and controlling the relative rotative movements of the portions 16, 16. However, such rotative movements are preferably effected and controlled by means of aerodynamic servo-flaps 25, 25 carried by the respective outboard lifting portions and adjustable relatively thereto about axes parallel with said radial axes. Mechanism controlled or actuated by the pilot is provided for moving and controlling the flaps 25, 25 so as to change and maintain the blade pitches for all conditions of flight.

Pilot Operated Blade Pitch Control Mechanism

Two pilot operable mechanisms are provided on the fuselage for effecting changes in the pitches of the several rotor blades, the first mechanism serving for effecting collective pitch changes and the second serving for effecting cyclic pitch changes. The two mechanisms have various parts in common as will presently appear. When flaps such as 25, 25 are provided for changing the blade pitches, said pilot operable mechanisms are connected with said flaps. The major portions of said pilot operable mechanisms are shown schematically in the lower portion of FIG. 3. These mechanisms have certain parts in common as will presently be apparent. Portions of the mechanisms to which the invention more particularly relate are shown in detail in FIGS. 4, 5 and 6.

The two pilot operable mechanisms are connected with mechanisms on the several blades 13, 13 for changing and maintaining the pitches thereof. As shown in the upper portion of FIG. 3, the last said mechanisms serve to change and maintain the pitches of the blades by means of flaps such as 25, 25. Certain portions of the pilot actuated and other mechanisms as shown in FIG. 3 are merely illustrative and any other suitable mechanism portions may be substituted.

The pilot operable mechanisms as shown in the lower portion of FIG. 3 include an azimuth assembly which is common to both mechanisms and is located at or near the bottom of the shaft 15 which shaft is hollow. The azimuth assembly includes a nonrotatable azimuth ring 26 and also includes swash plate 28 which is rotatable about an axis in fixed relationship to the ring. The azimuth assembly is adjustable vertically and it is also adjustable to angularly change the position of the axis of rotation of the swash plate. When the assembly is positioned with the ring 26 horizontal, or perpendicular to the axis of the shaft, the axis of rotation of the swash plate 28 is coincident with the shaft axis.

When there are four blades, there are four vertical rods 30, 30 which are located within the shaft 15 and which are pivotally connected at their lower ends to the swash plate 28. Each of the rods 30, 30 is connected at its upper end with mechanism for angularly moving the flap 25 of the corresponding blade.

The details of the connections from the rods 30 to the flaps 25 are not part of the present invention and these details can be widely varied. As shown, each rod 30 is pivotally connected at its upper end with the inner end of a corresponding lever 31 which is horizontally pivoted between its ends to a fixed support 32 on the hub 14. The lever 31 is connected at its opposite or outboard end with the upper end of a corresponding link 33. The lower end of each link 33 is connected with one arm of a corresponding bell crank 34 movable about a horizontal axis at 35 in fixed relation with the inboard member 17 of the corresponding blade. An actuating element or link 36 is connected with the other arm of the bell crank 34 and extends radially outwardly. The link 36 is connected with a lever 37 and a link 38 extends outwardly from the lever. Carried by the lifting portion 16 of the blade is a bell crank 39 to one arm of which the link 38 is connected. The other arm of the bell crank 39 is connected with the leading end of a transverse link 40, the trailing end of the link 40 being connected with a depending horn on the flap 25. FIG. 3 shows only the flap moving parts that are connected with one rod 30, the corresponding parts connected with the other rods being omited for simplicity of illustration.

The first pilot operable mechanism for effecting collective increases or decreases in the pitches of the several rotor blades includes a collective control member or stick 41 and also includes means connected with the stick for moving the azimuth assembly vertically for collective changes in the pitches of the blades. As shown, the stick 41 is pivotally movable in a vertical longitudinal plane, and it is so movable rearwardly and upwardly or forwardly and downwardly. For convenience, said stick will be referred to as movable rearwardly and forwardly. Said stick 41 is connected by means of a link 42, an arm 44, a shaft 46 and an arm 48 with an approximately vertical link 50. The link 50 is connected with a lever 52 which is pivoted between its ends, the lever in turn being connected with a link 54 which is moved upwardly and downwardly when the stick is moved rearwardly and forwardly. The link 54 is connected with a bell crank 56 which in turn is connected with a rearwardly extending longitudinal link 58.

The second pilot operable mechanism for effecting cyclic changes in the pitches of the several blades includes a cyclic control member or stick 60 and also includes means connected with the stick for moving the azimuth assembly angularly for cyclic changes in the pitches of the blades. The stick 60 is movable in any horizontal direction, that is, forwardly or rearwardly or transversely in either direction or in any intermediate direction. Longitudinal movements of the stick serve by means of an arm 62 to longitudinally move a connected longitudinal link 64. The link 64 is moved rearwardly when the stick 60 is moved forwardly and is moved forwardly when the stick is moved rearwardly. Lateral movement of the stick 60 serves by means of an arm 66, a link 68 and a bell crank 70 to longitudinally move a connected longitudinal link 72 which is parallel with the link 64. The link 72 is moved rearwardly when the stick 60 is moved toward the right and is moved forwardly when the stick 60 is moved toward the left.

The links 64 and 72 are connected respectively with bell cranks 74 and 76 which in turn are connected respectively with approximately vertical links 78 and 79 located adjacent the links 50 and 54. The link 79 is connected with a lever 80 which is pivoted between its ends, the lever being connected in turn to a link 81. The links 78 and 81 are connected respectively with bell cranks 82 and 84 which are at opposite sides of the bell crank 56 and are connected respectively with rearwardly extending longitudinal links 86 and 88 at opposite sides of the link 58.

For convenience of construction and conservation of space it may be preferable to locate the links 58, 86 and 88 near one side of the fuselage and they are shown as located near the left side. The axis of the shaft 15 and the center of the azimuth mechanism are in the central longitudinal vertical plane of the fuselage, and when the last said links are near one side it is necessary to transfer motion from one side of the fuselage to the center thereof. For this purpose the links 58, 86 and 88 are connected respectively with arms 90, 92 and 94 which are pivoted for movement about vertical axes. The last said arms are connected respectively with horizontal links 96, 98 and 100 which preferably extend rearwardly and laterally at an angle of 45°. The links are connected with a mechanism generally indicated at 102 in FIG. 3, and being fully shown in FIGS. 4, 5 and 6, this mechanism being below the azimuth mechanism.

The mechanism 102 is to some extent common to the two pilot operable mechanisms, one for collective pitch control and one for cyclic pitch control. Said mechanism 102 serves to transmit motion from the link 96 of the collective pitch mechanism to a vertical link 104 which moves the azimuth assembly upwardly and downwardly, and said mechanism 102 also serves to transmit motion from the links 98 and 100 of the cyclic pitch mechanism to vertical links 106, 108 which control angular movements of the azimuth assembly for cyclic pitch changes.

In the description that follows, all references to forward and rearward and lateral directions and movements are intended to designate such directions and movements with respect to the fuselage of the helicopter and not necessarily with respect either to free air or to the direction of helicopter movement. As viewed in FIG. 3, the forward direction is that of the arrow marked "Direction of Forward Flight."

Referring to FIG. 3 and also and more particularly to FIGS. 4, 5 and 6, the mechanism 102 comprises a main supporting frame 110 mounted in a fixed position, this frame serving to support all movable parts of the mechanism. Three connected generally horizontal first and second and third arms 112, 114 and 116 are provided which are pivotally movable in unison upwardly and downwardly about a fixed horizontal main axis. Preferably the three arms extend in the same direction from said main axis. As shown the first arm 112 is the generally horizontal arm of a bell crank 118 which has a generally vertical arm 120 and is mounted on the central portion of a horizontal rockshaft 122 which is suitably mounted in the frame 110. The arm 120 of the bell crank 118 preferably extends downwardly and it is connected with the link 96. The second and third horizontal arms 114 and 116 are connected to the shaft 122 for movement thereby. As shown, the arms 114 and 116 are fixedly secured to the shaft 122 and said arms are equally spaced from the arm 112 and from the swash plate axis and said arms 114 and 116 have the same length. However, there may be deviation from the last before mentioned details.

A means is connected with the arm 112 of the bell crank 118 for moving the azimuth assembly upwardly and downwardly, this means including the before-mentioned vertical link 104 which is connected at its upper end with a vertically movable support 124 for the rotatable swash plate 28 which in turn supports the azimuth ring 26. The upper end of the support 124 is universally connected to the center of the swash plate to vertically support the latter while nevertheless permitting the same to tilt in any direction. The support 124 is also rotatable relative to the link 104 about their common longitudinal axis to permit rotation of the swash plate relative to the link. The axis of rotation of the swash plate 28 is angularly adjustable with respect to the support 124, this angular adjustment being effected by the ring 26. Preferably the link 104 is directly connected at its lower end with the first arm 112 at an axis 126 which is parallel with and horizontally spaced from the main axis.

Two similar first and second bell cranks 128 and 130 are carried respectively by the second and third arms 114 and 116, these bell cranks being movable respectively about axes 132 and 134. The bell cranks 128 and 130 have generally vertical arms which preferably extend downwardly and are connected respectively with the links 98 and 100. The bell cranks 128 and 130 have generally horizontal arms which are connected respectively with the before-mentioned vertical links 106 and 108.

Inasmuch as the pivotal axes 132 and 134 of the bell cranks 128 and 130 are spaced from the main axis and from the shaft 122, said axes 132 and 134 and said bell cranks 128 and 130 are moved upwardly and downwardly when the link 104 and the azimuth assembly are so moved. As shown the axes 132 and 134 are in alignment with each other and they are shown as being spaced from the main axis to the same extent as the link 104. It will be observed that the axes 132 and 134 and the bell cranks 128 and 130 are moved upwardly and downwardly when the link 104 and the azimuth assembly are so moved. When the axes 132 and 134 are spaced from the main axis to the same extent as the link 104, the bell cranks are moved upwardly and downwardly to exactly the same extent as the azimuth assembly. The links 98 and 100 are approximately horizontal and therefore the relative motions transmitted to the bell cranks 128 and 130 and to the links 106 and 108 and to the azimuth ring 26 are not materially affected by the vertical movements of said bell cranks.

It is frequently preferable that the shaft 122 and the said main axis be located at an angle of 45° with respect to longitudinal lines. When the links 96, 98 and 100 are at angles of 45° the shaft and the main axis are perpendicular to said links. The location of the shaft and the main axis and also the bell crank axes at angles of 45° serves, when the rods 106 and 108 are equally spaced from the swash plate axis, to position one rod with its center in a longitudinal vertical plane through said swash plate axis and to position the other rod with its center in a transverse vertical plane through said swash plate axis. As shown the rod 106 is at the rear and the rod 108 is at one side, that is, at the right side.

*Explanation of Manner of Operation*

The stick or member 41 of the pilot operable collective pitch mechanism can be moved rearwardly to increase collective pitch and it can be moved forwardly to decrease collective pitch. When said member is moved rearwardly, the link 50 is moved downwardly, the link 54 is moved upwardly, the link 58 is moved rearwardly, the link 96 is moved rearwardly and rightwardly and the link 104 is moved upwardly. Thus, the entire azimuth assembly is moved upwardly to move all of the rods 30, 30 upwardly. These rods act through the described parts to adjust the flaps 25, 25 in such manner that the pitches of all of the blades are collectively increased. It will be obvious that when the stick or member 41 is moved forwardly the several described motions are reversed and the blade pitches are collectively decreased.

The stick or member 60 of the pilot operable cyclic pitch mechanism can be moved forwardly or rearwardly or rightwardly or leftwardly or in any intermediate direction to cause the helicopter to move in any direction, the direction of movement being the same as that of the stick.

When the stick 60 is moved rightwardly, the link 72 is moved rearwardly, the link 79 is moved upwardly, the link 81 is moved downwardly, the link 88 is moved forwardly, the link 100 is moved forwardly and leftwardly and the link 108 is moved downwardly, so that during rotation of swash plate 28 the rods 30, 30 are moved upwardly and downwardly. In so moving, the rods act through the described parts 31, 33, 34, 36, 37, 38, 39 and 40 on the several blades to adjust the flaps 25, 25 so as to produce the required cyclic pitch changes.

Referring particularly to the upper portion of FIG. 3, it will be understood that the rotor is rotating in the counterclockwise direction and that the blade controlled by the illustrated parts is extending directly forwardly. It will be assumed that the cyclic pitch stick has been moved toward the right as above stated and that the azimuth assembly has been tilted. When the blade extends forwardly, as shown, the rod $30^a$ which controls the flap 25 for said blade is positioned at the left. With the azimuth assembly tilted downwardly at the right and upwardly at the left, the rod $30^a$ at the left has been moved upwardly and the flap on the forwardly extending blade has been moved for the maximum blade pitch corresponding to the selected position of the stick 60. There is a lag of approximately 90° in the upward movement of the blade about its horizontal tilting axis and the blade shown at the front therefore attains its maximum upward flapping deflection about midway of its retreating movement. At the same time, the rod $30^b$, which is at the right and opposite the rod $30^a$, has been moved downwardly and the flap on the opposite or rearwardly extending blade, not shown, has been moved to provide the minimum blade pitch corresponding to the selected position of the stick 60. As the result of the said lag the blade that was at the rear attains its maximum downward flapping deflection midway of its advancing movement. Thus, there is a rotor disc tilt in the same direction as the tilt of the azimuth assembly and the helicopter is caused to move laterally toward the right. It will be obvious that when the stick 60 is moved laterally toward the left the several last described motions are reversed so that the cyclic pitch changes would tend to cause the helicopter to move toward the left.

When the cyclic pitch stick 60 is moved forwardly, the link 64 is moved rearwardly, the link 78 is moved upwardly, the link 86 is moved rearwardly, the link 98 is moved rearwardly and rightwardly and the link 106 is moved upwardly. Thus, the azimuth assembly is tilted forwardly. The rods 30, 30 and the associated parts are moved as before described, but they are differently timed to produce cyclic pitch changes which provide maximum pitch for each blade when it is midway of its retreating movement and to provide minimum pitch for each blade when it is midway of its advancing movement. By reason of the before-mentioned lag of approximately 90°, each blade attains its maximum upward flapping deflection when it is at the rear and attains its maximum downward flapping deflection when it is at the front. This action causes a rotor disc tilt in the same direction as the tilt of the azimuth assembly, that is, in the forward direction, and the helicopter is caused to move forwardly. Except for timing, the action is the same as described in connection with movement of the stick 60 toward the right. It will be obvious that when the stick 60 is moved rearwardly there is a reversal of the several motions described in connection with forward stick movement with the result that the cyclic pitch changes would cause the helicopter to move rearwardly.

The mounting of the bell cranks 128 and 130 on arms such as 114 and 116 that move upwardly and downwardly with the azimuth mechanisms enables the pilot operable mechanism to effect cyclic pitch control without any substantial modification thereof as the result of changes in collective pitch.

The positioning of the main pivotal axis of the several arms 112, 114 and 116 and also the bell crank axes 132 and 134 at angles of 45°, as previously described, conveniently enables the rods 106 and 108 to be properly located respectively in longitudinal and transverse planes, for example, at the rear and at the right side. Said rods 106 and 108 may extend vertically, as is preferable, so as to engage the azimuth ring at the rear and at one side. With the azimuth ring actuated by the vertical rods 106 and 108, said rods 30, 30 may also be vertical as is preferred.

When said main axis and the bell crank axes are at angles of 45°, the several links 96, 98 and 100 are preferably at angles of 45° and this provides for the convenient transfer of movements from one side of the fuselage to the central plane thereof.

The invention claimed is:

1. For use in a helicopter provided with a lifting rotor having a generally vertical drive shaft and a plurality of generally radial blades connected with said drive shaft and movable about spanwise pitch changing axes, the combination comprising an azimuth assembly for controlling the pitches of said blades and including a nonrotatable azimuth ring and a swash plate rotatable about an axis fixed relative to the ring and normally coincident with the rotor axis, a first vertical link connected with the center of said swash plate for moving said azimuth assembly upwardly and downwardly along said rotor axis, a second vertical link connected to said nonrotatable ring and located in a transverse plane passing through said rotor axis for tilting said azimuth assembly about a longitudinal horizontal axis, a third vertical link connected to said nonrotatable ring and located in a longitudinal plane passing through said rotor axis for tilting said azimuth assembly about a transverse horizontal axis, first and second and third bell cranks located below said azimuth mechanism and each of which bell cranks is supported for pivotal movement about a horizontal axis extending approximately 45° to said longitudinal plane, said bell cranks being associated respectively with said first and second and third vertical links and each of said bell cranks including a generally horizontal arm pivotally connected with the lower end of the associated vertical link and also including a generally vertical arm, and pilot operable means for moving said bell cranks about their horizontal pivot axes which means includes first and second and third generally horizontal links pivotally connected respectively to said vertical arms of said first and second and third bell cranks and which links extend generally perpendicular to said horizontal pivot axes of said bell cranks.

2. The combination defined in claim 1 further characterized by said azimuth assembly being located directly below the lower end of said rotor drive shaft.

3. The combination defined in claim 1 further characterized by means providing two arms extending generally parallel to and movable in unison with said horizontal arm of said first bell crank and about said first bell crank axis which two arms respectively pivotally support said second and third bell cranks so that said latter bell cranks are moved bodily upwardly and downwardly in unison with said first link.

4. The combination as defined in claim 3 further characterized by the pivot axes of said second and third bell cranks each being spaced from the axis of said first bell crank by a distance substantially equal to the spacing between said latter axis and the pivot axis of said first link relative to said first bell crank.

5. For use in a helicopter provided with a lifting rotor having a plurality of blades movable about spanwise pitch changing axes, the combination comprising an azimuth assembly including a nonrotatable azimuth ring and also including a swash plate rotatable about an axis in fixed relation to the ring and normally coincident with the rotor axis, means connected with said swash plate and said blades for effecting longitudinal cyclic pitch changes in response to tilting of said azimuth assembly about a transverse axis and lateral cyclic pitch changes in response to tilting of said azimuth assembly about a longitudinal axis and for collectively changing the pitches of said blades in response to bodily upward and downward movement of said swash plate, three parallel generally horizontal first and second and third arms located below said azimuth assembly and pivotally movable upwardly and downwardly about a fixed horizontal main axis perpendicular to said arms, means connected with the first arm at an axis horizontally spaced from said main axis and including a first vertical link which is connected at its upper end with said azimuth assembly for moving it upwardly and downwardly when said arms are moved, first and second bell cranks connected respectively with said second and third arms for movement about horizontal axes parallel with the main axis and horizontally spaced therefrom, said bell cranks being bodily movable upwardly and downwardly when said arms are moved and each of said bell cranks having a generally vertical arm and a generally horizontal arm, means connected with the horizontal arm of the first bell crank and including a second vertical link connected at its upper end with the azimuth ring for tilting the azimuth assembly to effect longitudinal cyclic pitch changes, means connected with the horizontal arm of the second bell crank and including a third vertical link connected at its upper end with the azimuth ring for tilting the azimuth assembly to effect lateral cyclic pitch changes, pilot operable means for moving said generally horizontal arms in unison about said main axis to cause them to move said azimuth assembly upwardly or downwardly for increasing or decreasing the collective pitch of said blades and to also move the bell cranks bodily upwardly and downwardly, and other pilot operable means for independently moving said first and second bell cranks about their axes to effect said longitudinal and cyclic pitch changes respectively, said main axis and said bell crank axes being at angles of approximately 45° to the longitudinal direction of flight, and said second and third vertical links being equally spaced from said swash plate axis and also equally spaced from said main axis with the result that said second link is disposed in a longitudinal vertical plane through said swash plate axis and that said third link is disposed in a transverse vertical plane through said swash plate axis.

References Cited in the file of this patent

UNITED STATES PATENTS

| | | |
|---|---|---|
| 2,318,260 | Sikorsky | May 4, 1943 |
| 2,473,331 | Donley | June 14, 1949 |
| 2,599,690 | Buivid et al. | June 10, 1952 |
| 2,860,711 | Dancik | Nov. 18, 1958 |
| 2,877,856 | Campbell | Mar. 17, 1959 |
| 3,053,326 | Derschmidt | Sept. 11, 1962 |

FOREIGN PATENTS

| | | |
|---|---|---|
| 988,872 | France | May 16, 1951 |
| 1,009,222 | France | Mar. 5, 1952 |